United States Patent [19]

Silverwater

[11] Patent Number: 5,220,837
[45] Date of Patent: Jun. 22, 1993

[54] DIFFERENTIAL PRESSURE TRANSDUCER ASSEMBLY

[75] Inventor: Bernard F. Silverwater, Plainview, N.Y.

[73] Assignee: Pall Corporation, Glen Cove, N.Y.

[21] Appl. No.: 858,595

[22] Filed: Mar. 27, 1992

[51] Int. Cl.$^5$ .............................................. G01L 13/06
[52] U.S. Cl. ...................................... 73/714; 73/754; 137/557; 137/599.1
[58] Field of Search ................. 73/714, 716, 717, 718, 73/719, 720, 721, 722, 754, 756; 137/599.1, 110, 557

[56] References Cited

U.S. PATENT DOCUMENTS

| | | | |
|---|---|---|---|
| 3,313,158 | 4/1967 | Di Giovanni | 73/720 |
| 3,718,048 | 2/1973 | Nolte | 73/716 |
| 4,498,497 | 2/1985 | Rosaen | 137/599.1 |
| 4,524,793 | 6/1985 | Silverwater . | |
| 4,662,213 | 5/1987 | Handy et al. | 73/716 X |
| 4,688,433 | 8/1987 | Silverwater . | |
| 4,813,446 | 3/1989 | Silverwater et al. . | |
| 4,823,604 | 4/1989 | Silverwater . | |
| 4,827,774 | 5/1989 | Silverwater . | |
| 4,986,127 | 1/1991 | Shimada et al. | 73/714 |
| 5,062,442 | 11/1991 | Stenstrom et al. | 137/110 |

Primary Examiner—Stephen M. Hepperle
Attorney, Agent, or Firm—Leydig, Voit & Mayer

[57] ABSTRACT

A transducer assembly for measuring the pressure difference between first and second pressures comprises a differential pressure transducer and a valve coupled to the differential pressure transducer. The differential pressure transducer has a first pressure region and a second pressure region and generates an electrical signal in response to a pressure differential between the first and second pressure regions. The valve is arranged to connect the first and second pressure regions when the pressure differential exceeds a first value. One embodiment of the valve comprises a chamber and a poppet. The chamber has a first port, a second port, and a wall. The cross sectional flow area of the chamber is larger than the cross sectional flow area of the first or second port. The poppet is disposed in the chamber and movable between a first position in which the first port of the chamber is closed by the poppet, a second position in which the second port of the chamber is closed by the poppet, and an intermediate position in which the wall of the chamber and the poppet comprise a flow restriction. The valve further comprises an element such as a spring for biasing the poppet toward the first seat.

11 Claims, 3 Drawing Sheets 5,220,837

DIFFERENTIAL PRESSURE TRANSDUCER ASSEMBLY

TECHNICAL FIELD OF THE INVENTION

This invention relates to a differential pressure transducer assembly equipped with a safety valve for protecting a differential pressure transducer from excessive pressure differentials.

BACKGROUND OF THE INVENTION

A filter for filtering liquids or gases is generally designed to withstand a certain pressure differential between its upstream and downstream sides. This pressure is usually referred to as the rated pressure of the filter. Over periods of use, dirt and other contaminants in the fluid being filtered accumulate on the surfaces of and within the filter and increase the resistance of flow through the filter, producing an increased pressure differential across the filter. If the accumulation of dirt becomes too great, the pressure differential across the filter may exceed the rated pressure or flow may be impeded. The filter may then become inefficient or rupture or otherwise fail, allowing unfiltered fluid to flow through the filter.

Consequently, a filter system, such as a filter system on an aircraft, can be equipped with a differential pressure transducer for measuring the differential pressure across a filter and generating a corresponding electrical output signal. When the transducer signals an onboard computer that the differential pressure has reached a certain percentage of the rated pressure of the filter, the computer activates a display or other device for alerting an operator of the filter system of the need to clean or replace the filter.

Since the purpose of the differential pressure transducer is to detect when the pressure across the filter reaches a certain value which is lower than the rated pressure of the filter, for reasons of economy and accuracy, the differential pressure transducer frequently is designed to have a lower rated pressure than the filter itself. This design poses no problems if the pressure differential across the filter rises only gradually and steadily as the filter collects dirt. However, during operation of a filtration system, the fluid pressures within the system may fluctuate. For example, on start-up in cold weather, the temperature of the fluid being filtered is lower, its viscosity generally is higher, and the pressure differential across the filter likewise is higher. During these conditions, the pressure differential across the filter may exceed the rated pressure of the differential pressure transducer and damage the transducer.

SUMMARY OF THE INVENTION

Accordingly, it is an object of the present invention to provide a differential pressure transducer assembly equipped with a safety shuttle valve which can protect a differential pressure transducer from pressure differentials which might damage the transducer.

It is another object of the present invention to provide a valve which can minimize the amount of unfiltered fluid which flows through the valve during its operation.

It is yet another object of the present invention to provide a differential pressure transducer assembly employing an inexpensive, accurate differential pressure transducer.

Accordingly, the present invention provides a transducer assembly for measuring the pressure difference between first and second pressures. The transducer assembly comprises a differential pressure transducer and a valve. The differential pressure transducer has a first pressure region and a second pressure region and generates an electrical signal in response to a pressure differential between the first and second pressure regions. The valve is coupled to the differential pressure transducer and arranged to connect the first and second pressure regions when the pressure differential exceeds a first value.

The present invention also provides a transducer assembly comprising a differential pressure transducer which has a first pressure region and a second pressure region and which generates an electrical signal in response to a pressure differential between the first and second pressure regions. The transducer assembly further comprises a valve coupled to the transducer. When the pressure differential is less than a first value, the valve is arranged to envelop a portion of the transducer including the first pressure region with fluid at the first pressure and envelop substantially the remainder of the transducer including a second pressure region with fluid at the second pressure. When the pressure differential exceeds the first value, the valve is arranged to envelop substantially the entire transducer including the first pressure region and with fluid at the first or second pressure.

The present invention further provides a valve which comprises a chamber and a poppet. The chamber has a first port, a second port, and a wall. The cross sectional area of the chamber is larger than the cross sectional area of the first or second port. The poppet is disposed in the chamber and movable between a first position in which the first port of the chamber is closed by the poppet, a second position in which the second port of the chamber is closed by the poppet, and an intermediate position in which the wall of the chamber and the poppet comprise at least a partial flow restriction. The valve further comprises an element such as a spring for biasing the poppet towards the first seat.

DETAILED DESCRIPTION OF THE PREFERRED EMBODIMENTS

Figure 1:
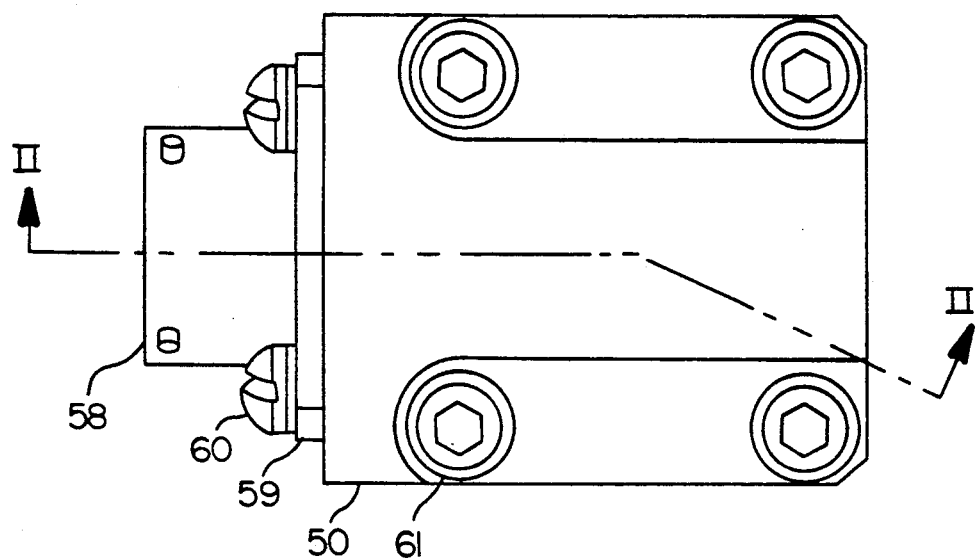
FIG. 1 is a plan view of an embodiment of a differential pressure transducer assembly equipped with a safety shuttle valve according to the present invention.

A preferred embodiment of a differential pressure transducer assembly equipped with a safety shuttle valve according to the present invention will now be described while referring to the accompanying drawings. As shown in these FIGS., the assembly includes a housing 100, a differential pressure transducer 40, and a safety shuttle valve 70 disposed within the housing 100. The assembly is mounted to the base 90 of a filter system and is used to monitor the differential pressure of a fluid (e.g., a gas or a liquid) on the upstream and downstream sides of a filter (unillustrated).

The housing 100 of this embodiment has a two-piece construction and comprises a housing body 10 and a cover 50 secured to the housing body 10. However, the number of sections in the housing 100 is not critical, and it may comprise a single section or three or more sections. The housing body 10 has a series of interconnected cavities formed therein. One of these is a transducer cavity 11 in which is housed the differential pressure transducer 40. One side of the transducer cavity 11 communicates with a high pressure cavity 15, which is filled with fluid at the pressure of the upstream side of the filter. The lower portion of the high pressure cavity 15 communicates with a valve cavity 19 that houses the safety shuttle valve 70. The lower end of the valve cavity 19 connects to the outer surface of the housing body 10 via an inlet 20.

The other side of the transducer cavity 11 communicates with a low pressure cavity 16, which is filled with fluid at the pressure of the downstream side of the filter. The upper end of the low pressure cavity 16 is connected with a recess 18 formed in the top end surface of the housing body 10. The housing body 10 can be made of any material which is compatible with the fluid being monitored by the transducer 40 and which can withstand the fluid pressure. For example, when the fluid being filtered is at a high pressure, a high-strength, corrosion resistant material such as stainless steel is suitable for the housing body 10.

Any type of differential pressure transducer capable of measuring the difference in the pressures of two fluids can be employed in the present invention. Since the differential pressure transducer 40 of the illustrated embodiment measures the pressure differential across a filter, the transducer 40 is preferably one capable of measuring the difference in pressures of two fluids of the same phase, such as two liquids or two gases. For example, the illustrated differential pressure transducer 40 has a flanged casing which may contain a piezoelectric element (unillustrated) that senses differential pressure and generates an electrical signal indicative of the pressure differential acting on the element. The element has a rated pressure or a maximum differential pressure up to which there is no permanent damage. A low pressure port (unillustrated) may be formed in the flange 41 of the casing, allowing communication between the outer surface of the flange 41 and the one side of the element. A high pressure port (unillustrated) may be formed in the bottom surface of the casing allowing communication between the high pressure cavity 15 and the other side of the element. If high pressure and low pressure liquids are allowed within the casing, it may be desirable to protect the electronics within the casing from the liquids, for example, by coating them. Although the pressure ports of the illustrated transducer 40 are on opposite sides of the transducer 40, this arrangement is arbitrary. For example, it is possible to instead use a conventional transducer of the type having both of its pressure ports on a single side, such as that disclosed in U.S. Pat. No. 4,823,604.

Figure 2:
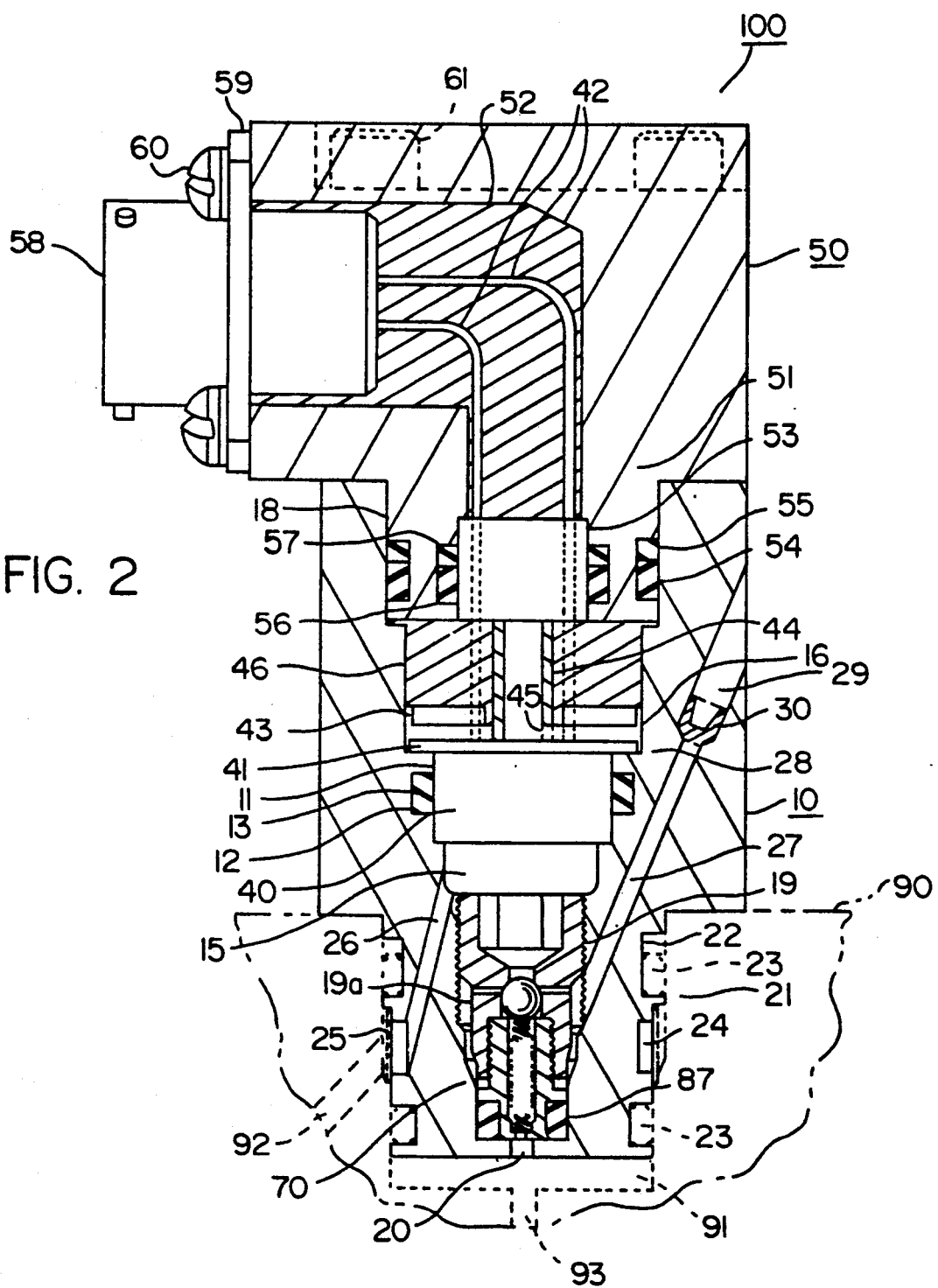
FIG. 2 is a cross-sectional view of the differential pressure transducer assembly taken along Line II—II of FIG. 1.

Fluid is prevented from leaking past the transducer 40 from the high pressure cavity 15 to the low pressure cavity 16 by a seal member such as an O-ring 13 which can be disposed in a recess 12 surrounding the transducer cavity 11. Except for those portions of the transducer casing in contact with the O-ring 13, substantially the entire outer surface of the transducer casing is preferably surrounded by the fluid in the high pressure cavity 15 and the fluid in the low pressure cavity 16. Namely, those portions of the transducer 40 below the O-ring 13 in FIG. 2 are preferably substantially surrounded by fluid from the high pressure cavity 15, and those portions above the O-ring are preferably substantially surrounded by fluid from the low pressure cavity 16. Because the transducer 40 is substantially surrounded by fluid, the pressure differential across the transducer casing is no greater than the pressure differential being measured by the piezoelectric element. Therefore, the transducer casing can be extremely light weight, and an inexpensive, disposable transducer can be employed even when the pressures on the upstream and downstream sides of the filter are extremely high.

The transducer 40 includes electrical leads 42 which extend from the flange 41 of the transducer casing and a temperature compensation disk 43 electrically connected to the leads 42. The temperature compensation disk 43 is a standard element of many commercially-available differential pressure transducers 40 and compensates for the effect that temperature variations have on the electrical characteristics of the leads 42, the piezoelectric element, and other electrical components of the transducer 40 so that the electrical signal obtained from the leads 42 will be stable over a prescribed temperature range.

In the illustrated embodiment, the high pressure cavity 15 and the low pressure cavity 16 are on opposite sides of the transducer 40, so the difference in pressure between the two cavities tends to force the differential pressure transducer 40 upwards into the low pressure cavity 16. The differential pressure transducer 40 is restrained from upwards movement by a rigid sleeve 44 disposed between the cover 50 and the flange 41 of the transducer casing. The lower end of the sleeve 44 surrounds the low pressure port of the transducer 40, and a hole 45 is formed in the sleeve 44 to allow fluid from the low pressure cavity 16 to flow into the sleeve 44 and communicate with the low pressure port. The upper portion of the low pressure cavity 16, as well as the lead cavity 52, can be filled with a potting compound 46 which surrounds the leads 42. The potting compound 46 isolates the leads 42 from one another and prevents mechanical damage to the leads 42 due to vibrations or stresses applied to the housing 100 during use or installation. The potting compound 46 need not make a tight seal because the cover 50 may be sealed to the housing body 10 by gaskets. The potting compound may simply serve to dampen vibration of the leads 42. An example of a suitable potting compound 46 is a fluorosilicone potting compound.

The cover 50 has a neck 51 which mates with the recess 18 in the top portion of the housing body 10. A liquid-tight seal is formed between the neck 51 and the recess 18 by an O-ring 54 and a backup ring 55 disposed atop one another in a groove formed in the outer periphery of the neck 51. A lead cavity 52 for the transducer leads 42 is formed in the cover 50 between the bottom surface of the neck 51 and an external surface of the cover 50. The bottom end of the lead cavity 52 is closed off by a wire pass-through 53 made of an electrically insulating material such as a ceramic or glass. The transducer leads 42 extend through the wire pass-through 53. The lower surface of the wire pass-through 53 bears against the upper end of the sleeve 44, and the upper surface of the wire pass-through 53 bears against a ledge formed in the cover 50. Fluid is prevented from leaking around the wire pass-through 53 by an O-ring 56 and a backup ring 57 disposed in a groove formed in the walls of the lead cavity 52 surrounding the wire pass-through 53. The other end of the lead cavity 52 is closed off by a conventional electrical connector 58 mounted on a plate 59 and electrically connected to the leads 42 of the transducer 40. The plate 59 can be connected at the end of the lead cavity 52 by any suitable means, such as by screws 60. The connector 58 enables the leads 42 to be electrically connected to a device, such as a computer, a display, or an alarm for utilizing the output signal from the transducer 40.

The cover 50 can be connected to the housing body 10 by any means which is able to withstand the force generated by the fluid within the high and low pressure cavities, which tends to push the cover 50 away from the housing body 10. In the present embodiment, the cover 50 is secured to the housing body 10 by a plurality of screw 61 extending from the top surface of the cover 50 through unillustrated holes down into the housing body 10.

The housing 100 is secured in any suitable manner to the base 90 or other portion of the filter system containing the filter across which the pressure differential is to be monitored. The fluid pressure within the base 90 tends to push the housing 100 away from the base 90, so the housing 100 is preferably rigidly connected to the base 90 by suitable means such as screws or bolts. For example, by extending the screws 61 downwardly from cover 50 through the entire length of the housing body 10 into the base 90, the same screws 61 can be used to secure the cover 50 to the housing body 10 and the housing body 10 to the base 90 or other member on which the assembly is to be mounted. Alternatively, the housing 100 may be threaded directly to the base 90.

The housing body 10 has a connecting portion in the form of a neck 21 that fits into a recess 91 formed in the base 90. The recess 91 communicates with the upstream side of the filter via an upstream passage 92 and with the downstream side of the filter via a downstream passage 93. A plurality of O-rings 23 are disposed in corresponding grooves 22 formed in the outer surface of the neck 21 to form a liquid-tight seal between the neck 21 and the base 90. A circumferentially-extending groove 24 is formed in the outer surface of the neck 21 between the O-rings 23. This groove 24 is connected with the high pressure cavity 15 by an upstream passage 26, and when the neck 21 is inserted into the recess 91, the groove 24 communicates with the upstream passage 92 in the base 90. Since fluid in the upstream passage 92 of the base 90 is from the upstream side of the filter, it has not been filtered, so an annular filter element 25 is mounted over the groove to filter all fluid entering the groove 24 from upstream passage 92. The filter element 25 is preferably designed to prevent passage of any particles large enough to interfere with the operation of the safety shuttle valve 70. For example, it may be designed to keep particles larger than 25 micrometers away from the valve 70.

The inside of the valve cavity 19 is connected to the low pressure cavity 16 by a first connecting passage 27 and a second connecting passage 28 that extends off the first connecting passage 27. The downstream end of the first connecting passage 27 is connected to an external passage 29 which extends to the outside of the housing body 10. During operation of the differential pressure transducer assembly, the external passage 29 is sealed by a seal plug 30. The external passage 29 is not essential and can be omitted, but it makes it easy to form the first connecting passage 27 by boring diagonally through the housing body 10 from a side surface into the valve cavity 19. Alternatively, the first connecting passage 27 can be drilled from the center of the neck 21 to intersect the second connecting passage 28 and form the inlet passage 20 in one operation.

Generally, a shuttle valve is one which has at least two seats and an element which shuttles between the seats. A principal purpose of the safety shuttle valve 70 of the present invention is to prevent the pressure differential between the high pressure cavity 15 and the low pressure cavity 16 from exceeding the rated pressure of the transducer 40 and thereby prevent damage to the transducer. The safety shuttle valve 70 connects the low pressure cavity 16 with the downstream side of the filter when the differential pressure across the fluid is below a prescribed value, and when the differential pressure exceeds the prescribed value (which may be chosen to be less than the rated pressure of the transducer 40), the safety shuttle valve 70 connects the low pressure cavity 16 to the upstream side of the filter, equalizing the pressure on both sides of the differential pressure transducer 40.

Figure 3:
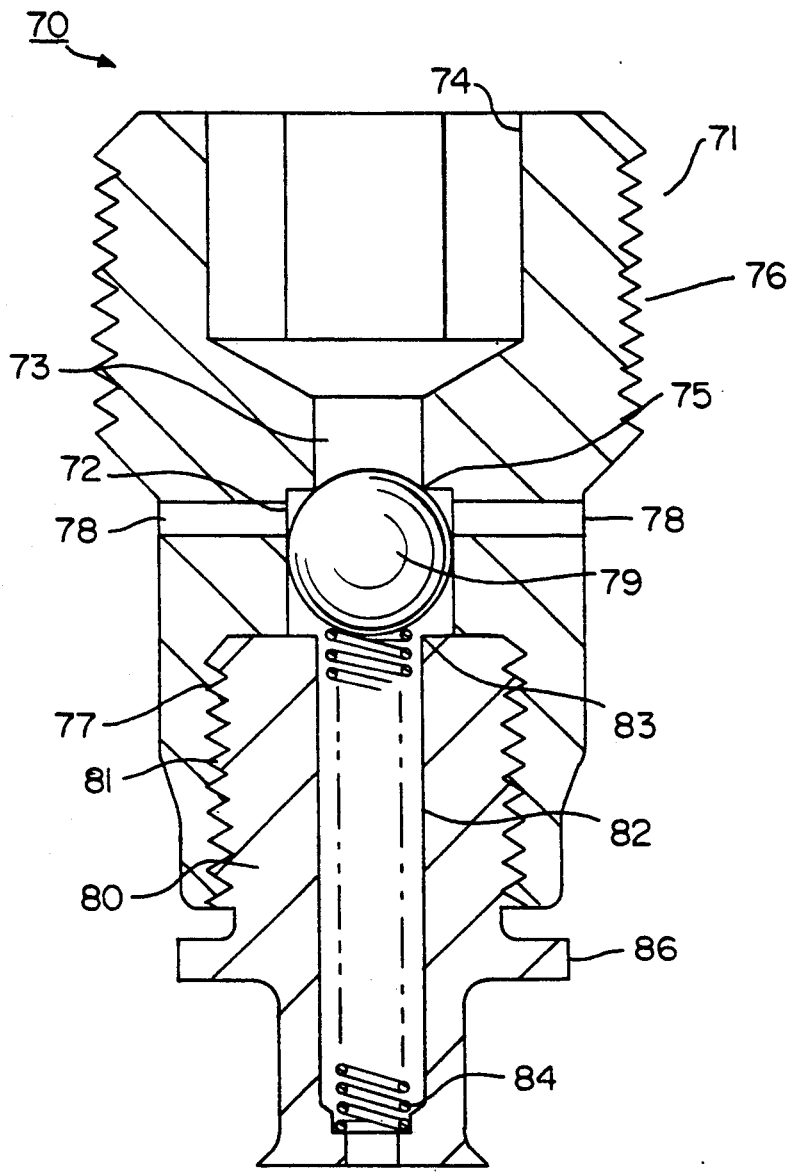
FIG. 3 is an enlarged cross-sectional view of the safety shuttle valve of FIG. 2.

FIG. 3 is an enlarged cross-sectional view of one safety shuttle valve 70 embodying the invention. The valve 70 has a body 71 in which is formed a flow control chamber 72 for regulating the flow of fluid through the valve 70. The upper portion of the flow control chamber 72 communicates with the upper end of the valve body 71 via an upstream port 73 and a bore 74 which opens onto the high pressure cavity 15. Threads 76 are formed on the outer surface of the upper portion of the valve body 71. These threads 76 engage with internal threads formed in the upper portion of the valve cavity 19 of the housing body 10 and can be sealed to the internal threads of the housing body 10 by a thread sealant. The bore 74 is preferably formed with a polygonal inner surface for receiving an Allen wrench, for example, by means of which the valve body 71 can be screwed into the valve cavity 19. The lower portion of the flow control chamber 72 opens onto an adjusting rod cavity 77 formed in the bottom half of the valve body 71. At least one radial connecting port 78 extends between the flow control chamber 72 and the outer surface of the valve body 71. The angle of the radial connecting ports 78 with respect to the flow control chamber 72 is not critical.

The outer dimensions of the valve body 71 are chosen so that when the safety shuttle valve 70 is inserted into the valve cavity 19 of the housing body 10, an annular space 19a for fluid is formed between the inner periphery of the valve cavity 19 and the outer periphery of the valve body 71. The radially outer ends of the radial connecting ports 78 and the upstream end of the first connecting passage 27 in the valve body 10 communicate with this annular space 19a.

The adjusting rod cavity 77 receives an adjusting rod 80 having external threads 81 which screw into internal threads formed in the adjusting rod cavity 77. A central bore 82 extends between the upper and lower ends of the adjusting rod 80. When the safety valve 70 is inserted into the valve cavity 19 of the housing body 10, the bore 82 connects the flow control chamber 72 with the inlet 20 of the housing body 10 and acts as a downstream port for the flow control chamber 72. A compression spring 84 is disposed inside the bore 82, the lower end of the spring 84 resting on a ledge which is formed in the lower end of the bore 82 and which serves as a spring seat.

The flow control chamber 72 contains a reciprocating poppet 79 which shuttles between two positions, in one of which the inside of the flow control chamber 72 communicates with the upstream side of the filter and in the other of which the inside of the flow control chamber 72 communicates with the downstream side of the filter. In the present embodiment, the reciprocating poppet 79 is in the form of a rigid ball, such as a ball bearing, although a differently shaped poppet can be used, such as a flat disc or a conical member. The cross-sectional shape of the flow control chamber 72 is preferably similar to that of the reciprocating poppet 79, so when the poppet 79 is a ball or is conically shaped, the flow control chamber 72 is preferably cylindrical.

A ledge formed in the upper surface of the flow control chamber 72 serves as an upstream seat 75 for the poppet 79, while a ledge surrounding the upper end of the central bore 82 of the adjusting rod 80 serves as a downstream seat 83. The poppet 79 is biased towards the upstream seat 75 by the compression spring 84, the upper end of which contacts the surface of the poppet 79. When the poppet 79 seats on the upstream seat 75, i.e., is in the upstream position, the low pressure cavity 16 communicates with the downstream side of the filter via the downstream passage 93, the inlet 20, the central bore 82 of the adjusting rod 80, the flow control chamber 72, the radial connecting ports 78, the annular space 19a, and the first and second connecting passages 27 and 28. When the poppet 79 seats on the downstream seat 83, i.e., is in the downstream position, the low pressure cavity 16 communicates with the upstream side of the filter via the upstream passage 92, the groove 24 in the neck 21, the high pressure conduit 26, the high pressure cavity 15, the bore 74, the upstream port 73, the flow control chamber 72, the radial connecting ports 78, the annular space 19a, and the first and second connecting passages 27 and 28.

A flange 86 is formed on a portion of the outer surface of the adjusting rod 80 located outside of the adjusting rod cavity 77. When the safety shuttle valve 70 is inserted into the valve cavity 19 of the housing body 10, an O-ring 87 is disposed between the lower surface of the flange 86 and the bottom surface of the valve cavity 19. The O-ring 87 prevents leakage of fluid between the outside of the adjusting rod 80 and the walls of the valve cavity 19. In the present embodiment, the bottom end of the adjusting rod 80 is slightly flared to hold the O-ring 87.

In a preferred mode of operation of the differential pressure transducer assembly of FIG. 2, fluid from the upstream side of a filter is present in the high pressure cavity 15, while fluid from the downstream side of the filter is present in the low pressure cavity 16. When the pressure differential between the upstream and downstream sides of the filter is below the a first prescribed pressure differential, which is preferably less than the rated pressure of the transducer 40, the poppet 79 is seated on the upstream seat 75 by the spring 84. The low pressure cavity 16 then communicates with the downstream side of the filter. In this state, the differential pressure transducer 40 measures the difference between the pressures in the high pressure cavity 15 and the low pressure cavity 16, so it is measuring the pressure differential across the filter. Furthermore, the upper portion of the differential pressure transducer 40 is surrounded by the fluid in the low pressure cavity 16, while the lower portion of the differential pressure transducer 40 is surrounded by the fluid in the high pressure cavity 15, so the pressure across the walls of the transducer casing is no greater than the difference between the pressures of the two fluids.

As the filter becomes increasingly clogged with dirt or if the fluid becomes highly viscous due, for example, to low temperature, the pressure differential across the filter increases. In accordance with one aspect of the invention, when the pressure differential across the filter exceeds the first prescribed pressure differential, i.e., the cracking pressure, the poppet 79 moves to the downstream seat 83. The magnitude of the cracking pressure is established by the characteristics of the spring 84 and the cross sectional area of the upstream seat 75. With the poppet 79 seated against the downstream seat 83, communication between the downstream side of the filter and the flow control chamber 72 is cut off. Instead, the high pressure cavity 15 is connected with the low pressure cavity 16. The pressure in the low pressure cavity 16 then rises to the pressure within the high pressure cavity 15, i.e., the pressure on the upstream side of the filter. As a result, the pressure differential acting on the differential pressure transducer 40 is reduced to zero, so the differential pressure transducer 40 is protected from damage. Furthermore, the entire differential pressure transducer 40 remains surrounded by fluid at the pressure of the upstream side of the filter, so regardless of how high this pressure rises, there is no possibility of the casing or the pressure sensing element of the transducer 40 being damaged.

After the filter has been cleaned or replaced or after the fluid has warmed up and is less viscous, the pressure differential across the filter decreases. When the pressure differential across the filter falls below a second prescribed pressure differential, i.e., the reseat pressure, which is somewhat less than the cracking pressure, the poppet 79 moves from the downstream seat 83 to the upstream seat 75. The low pressure cavity 16 is then isolated from the high pressure cavity 15 and once again communicates with the downstream side of the filter, so the differential pressure transducer 40 can again measure the pressure differential across the filter.

Although the reseat pressure is generally less than the cracking pressure, it is preferably not set to be unduly low. The lower the reseat pressure, the more inactive the pressure transducer assembly becomes since the pressure transducer is not measuring differential pressure while the poppet 79 is seated on the downstream seat 83. In a preferred embodiment, the minimum reseat pressure is in the vicinity of about 70% of the cracking pressure.

In the embodiment of FIG. 2, the transducer assembly is oriented so that the poppet 79 moves vertically between the upstream and downstream seats 75, 83. However, the orientation of the transducer assembly is totally arbitrary and the safety shuttle valve 70 can function properly in any position.

As the poppet travels between the upstream and downstream seats 75, 83 in either direction, fluid can bypass the principal filter, flowing from the upstream side of the principal filter through the relatively coarse annular filter 25 to the high pressure cavity 15 and from the high pressure cavity 15 through the safety valve 70 to the downstream side of principal filter. In accordance with another aspect of the invention, the safety shuttle valve 70 is designed so that the poppet 79 travels between the seats 75, 83 very rapidly, minimizing the amount of fluid which bypasses the principal filter, and so that the reseat pressure is as high as possible. In the illustrated embodiment, the clearance between the poppet 79 and the wall of the flow control chamber 72, the location of the radial connecting passages 78, the relative cross sectional areas of the upstream and downstream seats 75, 83, and the distance between the upstream and downstream seats 75, 83 contribute, both individually and in combination, to the preferred action of the safety shuttle valve 70.

For example, the clearance between the poppet 79 and the wall of the flow control chamber 72 is preferably small enough to constitute a third and at least partial flow restriction between the upstream and downstream seats 75, 83, which constitute the first and second flow restrictions of the safety shuttle valve 70 when the poppet 79 is seated on the upstream and downstream seats 75, 83, respectively. At the cracking pressure, the high pressure fluid bears against the poppet 79 in an area corresponding to the cross sectional area of the upstream seat 75 and forces the poppet 79 away from the upstream seat 75. The movement of the poppet 79, in turn, slightly compresses the spring 84 and increases the force of the spring 84 against the poppet 79. By making the clearance between the poppet 79 and the wall of the flow control chamber 72 sufficiently small, the force exerted on the poppet 79 by the high pressure fluid significantly increases once the poppet 79 unseats from the upstream seat 75. The high pressure fluid is then exerted over a larger area of the poppet 79 than just the area of the poppet 79 corresponding to the cross sectional area of the upstream seat 75. The increased force exerted on the poppet 79 by the high pressure fluid easily overcomes the additional counter force exerted by the compressed spring 84 and the low pressure fluid and snaps the poppet 79 against the downstream seat 83 very rapidly. This snap action of the safety shuttle valve 70 minimizes the amount of fluid which passes from the high pressure chamber 15 to the downstream side of the primary filter as the ball travels between the upstream and downstream seats 75, 83.

Although the clearance between the poppet 79 and the wall of the flow control chamber 72 is sufficiently small to increase the force exerted on the poppet 79 by the high pressure fluid, it is preferably not so small as to constitute a total flow restriction, which substantially blocks the flow of fluid between the poppet 79 and the wall of the flow control chamber 72, or to dominate the first and second flow restrictions. For example, the minimum open flow areas of the upstream port 73 at the upstream seat 75 and the central bore 82 at the downstream seat 83 may each have a smaller cross-sectional area than the flow area between the wall of the chamber 72 and the poppet 79. If the wall clearance were small enough to constitute a total or dominant flow restriction, the high pressure fluid would act against all or substantially all of the cross-sectional area of the poppet 79, greatly increasing the force exerted on the poppet 79 toward the downstream seat 83. This would shuttle the poppet 79 from the upstream seat 75 to the downstream seat 83 even more rapidly, but it would also result in a very low reseat pressure, which is undesirable.

Consequently, in a preferred embodiment the wall clearance is a partial flow restriction, i.e., one which increases the force exerted on the poppet 79 by the high pressure fluid once the poppet 79 lifts off the upstream seat 75 but which is not a total or dominant flow restriction. For example, the wall clearance may be dimensioned such that the force exerted by the high pressure fluid on the poppet 79 once the poppet 79 lifts off the upstream seat 75 is less than about 50% greater than the force exerted on the poppet 79 by the high pressure fluid when the poppet 79 is seated on the upstream seat 75. More preferably, the wall clearance is dimensioned such that the force is less than about 25% greater and, most preferably, such that the force is in the range from about 5% to about 15% greater.

The radial connecting passages 78 are preferably located so they intersect the flow control chamber 72 without opening onto the region where the poppet 79 is closest to the wall of the flow control chamber 72. Otherwise, the clearance between the poppet 79 and the wall of the flow control chamber 72 will greatly increase in the vicinity of the radial connecting passages 78, preventing the wall clearance from serving as a flow restriction. The radial connecting passages 78 may intersect the flow control chamber 72 near the downstream seat 83 or, more preferably, near the upstream seat 75, as shown in FIGS. 1 and 2.

The distance between the upstream and downstream seats 75, 83 is preferably large enough to allow the poppet 79 to separate sufficiently from the upstream seat 75 that particles passed through annular filter 25 can be washed through and that the wall clearance becomes at least a partial flow restriction until the poppet 79 gets close enough to the downstream seat 83 that the downstream seat 83 is the operative flow restriction. On the other hand, the distance is sufficiently small enough to prevent the wall clearance from being a controlling factor when the poppet 79 reseats from the downstream seat 83 to the upstream seat 75. In other words, this distance is preferably the smallest distance possible which will allow the wall clearance to function as a third partial flow restriction. Minimizing the distance traveled by the poppet 79 both minimizes the amount of fluid which bypasses the primary filter and allows a higher reseat pressure to be established. Distances as large as 0.004 inch or larger or as small as 0.001 inch or smaller are suitable.

To reliably maintain the poppet 79 against the downstream seat 83, the cross sectional area of the downstream seat 83 is preferably greater than the cross sectional area of the upstream seat 75. When the poppet 79 is seated against the downstream seat 83, the spring 84 is slightly more compressed and, therefore, exerts a slightly greater force on the poppet 79 than when the poppet 79 is seated against the upstream seat 75. The larger cross sectional area of the downstream seat 83 allows the high pressure fluid to bear against the poppet 79 with greater force which counters the greater force of the compressed spring 84 and reliably maintains the poppet 79 seated against the downstream seat 83. However, to allow the reseat pressure to be as high as possible, the cross sectional area of the downstream seat 83 is preferably no greater than necessary to reliably seat the poppet 79 on the downstream seat 83. For example, the cross sectional area of the downstream seat 83 may be about 3% or more greater than that of the upstream seat 75.

In one example of a safety shuttle valve embodying the invention, the poppet has a diameter of about 0.15625 inch, the flow control chamber has a diameter of about 0.16 inch, the upstream seat has a diameter of about 0.105 inch, the downstream seat has a diameter of about 0.107 inch, the poppet travels a distance in the range from about 0.002 inch to about 0.004 inch between the upstream and the downstream seats, and the radial ports have a diameter of about 0.023 inch and are located near the upstream seat.

Although the invention has been described in terms of one or more exemplary embodiments, it is not limited to those embodiments. Alternative embodiments and modifications which are nonetheless encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

What is claimed is:

1. A transducer assembly for measuring the pressure difference between first and second pressures comprising:
   a differential pressure transducer having a first pressure region and a second pressure region, the transducer generating an electrical signal in response to a pressure differential between the first pressure and the second pressure regions;
   a valve comprising a chamber having a first port, a second port, and a connecting port formed therein, the first port communicating with the first pressure region of the transducer and the connecting port communicating with the second pressure region of the transducer, a poppet disposed in the chamber and movable between a first position in which the first port is closed by the poppet and the second port communicates with the connecting port through the chamber and a second position in which the second port is closed by the poppet, the first port is fluidly connected with the connecting port through the flow control chamber, and the first and second regions of the pressure transducer communicate with one another, and means for biasing the poppet towards the first position.

2. A transducer assembly as claimed in claim 1 wherein the chamber includes a wall and wherein the poppet is movable to an intermediate position in which the clearance between poppet and the wall comprises at least a partial flow restriction.

3. A transducer assembly as claimed in claim 2 wherein the connecting port is spaced from the intermediate position.

4. A transducer assembly as claimed in claim 1 wherein the biasing means is coupled to the poppet such that the poppet moves from the first position to the second position at a first pressure differential and moves from the second position to the first position at a second pressure differential which is less than the first pressure differential.

5. A transducer assembly as claimed in claim 1 wherein the transducer has a maximum differential pressure up to which there is no permanent damage and the first pressure differential is no greater than the maximum differential pressure.

6. A transducer assembly as claimed in claim 1 wherein the poppet is spherical and the chamber has a circular cross section.

7. A transducer assembly as claimed in claim 1 wherein the minimum open flow area of the first and second ports of the chamber each have a smaller cross-sectional area than the flow area between a wall of the chamber and the poppet.

8. A transducer assembly as claimed in claim 1 wherein a first portion of the transducer including the first pressure region is enveloped with fluid and substantially the remainder of the transducer including the second pressure region is enveloped with fluid at the second pressure when the poppet is in the first position and wherein substantially the entire transducer including the first pressure region and the second pressure region is enveloped with fluid at the first pressure when the poppet is in the second position.

9. A transducer assembly as claimed in claim 1 wherein the cross-sectional area of the second port is greater than the cross-sectional area of the first port.

10. A transducer assembly for measuring the pressure difference between first and second pressures comprising:
    a differential pressure transducer having a high pressure region and a low pressure region, the transducer generating an electrical signal in response to a pressure differential between the high and low pressure regions; and
    a valve coupled to the differential pressure transducer and arranged to connect the high and low pressure regions when a pressure in the high pressure region exceeds a pressure in the low pressure region by a predetermined value.

11. A transducer assembly for measuring the pressure difference between first and second pressures comprising:
    a differential pressure transducer having a first pressure region and a second pressure region, the transducer generating an electrical signal in response to a pressure differential between the first and second pressure regions;
    a valve coupled to the transducer and arranged to envelop a portion of the transducer including the first pressure region with fluid at the first pressure and envelop substantially the remainder of the transducer including the second pressure region with fluid at the second pressure when the pressure differential is less than a first value and to envelop substantially the entire transducer including the first pressure region and the second pressure region with fluid at the first pressure when the pressure differential exceeds the first value.

* * * * *